(12) United States Patent
Morrison

(10) Patent No.: US 6,279,102 B1
(45) Date of Patent: *Aug. 21, 2001

(54) METHOD AND APPARATUS EMPLOYING A SINGLE TABLE FOR RENAMING MORE THAN ONE CLASS OF REGISTER

(75) Inventor: Michael J. Morrison, Santa Clara, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,142

(22) Filed: Dec. 31, 1997

(51) Int. Cl.[7] .................................................. G06F 9/30
(52) U.S. Cl. ................................. 712/216; 712/208
(58) Field of Search ............................. 712/23, 18, 201, 712/208, 216

(56) References Cited

U.S. PATENT DOCUMENTS

| | | | | |
|---|---|---|---|---|
| 5,627,985 | * | 5/1997 | Fetterman et al. | 712/217 |
| 5,721,855 | * | 2/1998 | Hinton et al. | 395/394 |
| 5,876,016 | * | 10/1999 | Eisen et al. | 712/216 |
| 5,890,008 | * | 3/1999 | Panwar et al. | 395/800.15 |
| 6,081,880 | * | 6/2000 | Sollars | 711/202 |

* cited by examiner

Primary Examiner—David Y. Eng
(74) Attorney, Agent, or Firm—Blakely, Sokoloff, Taylor & Zafman LLP

(57) ABSTRACT

In one aspect the present invention provides for an apparatus that includes at least two physical registers and a rename unit to assign at least one of the physical registers to an original register. The original register appears as a destination address in a micro-op. The apparatus includes a rename table having a location for recording the assigned physical register to the original register. The location has at least one bit for indicating whether the assigned physical register belongs to a first or a second class. The rename table is connected to the rename unit and is adapted to lookups of the assigned physical register.

19 Claims, 5 Drawing Sheets

Instruction Sequence $T = \text{micro-op}_1\{A, B\};$ first micro-op   2

$T = \text{micro-op}_2\{C, D\};$ second micro-op 3

$E = \text{micro-op}_3\{T, A\};$ third micro-op   4

1

Renamed Instruction Sequence $R = \text{micro-op}_1\{A, B\};$ first micro-op   5

$R' = \text{micro-op}_2\{C, D\};$ second micro-op 6

$E = \text{micro-op}_3\{R', A\};$ third micro-op   8

METHOD AND APPARATUS EMPLOYING A SINGLE TABLE FOR RENAMING MORE THAN ONE CLASS OF REGISTER

BACKGROUND OF THE INVENTION

1. Field of the Invention

This invention relates generally to a method and an apparatus useful in processors and computers, and more particularly, to a method and apparatus for employing a combined rename table for more than one class of register.

2. Description of the Related Art

Many processors and similar hardware structures increase instruction throughput by executing instructions either in parallel or out-of-order. An out-of-order processor is ordinarily more efficient when the execution order is more flexible. The small number of registers in many modern computers introduces artificial dependencies among instructions that lower the flexibility of the execution order. Renaming of registers eliminates some of the artificial dependencies that reduce the efficiency of out-of-order execution.

Decoding expands macro-instructions into simpler instructions referred to as micro-operations (micro-ops). Decoding introduces "temporary" registers as source or destination addresses of the micro-ops for storing intermediate results. When the same temporary register appears in more than one micro-op, a dependency occurs. Dependencies occurring in write-after-write and write-after-read sequences of micro-ops are artificial and can be removed by the renaming of registers.

FIG. 1 illustrates the effect of renaming on the execution of a write-after-write sequence of micro-ops, i.e. two micro-ops having the same register as a destination address. At block 1, micro-ops 2, 3, 4 are in the original instruction order. A register T is the destination address of the first and second micro-ops 2, 3 and is a source address of the third micro-op 4. Thus, the execution of the third micro-op 4 uses data stored in the register T by the second micro-op 3. If execution order of the first and second micro-ops 2, 3 is inverted, the execution of the third micro-op 4 uses data stored in the register T by the first micro-op 2 instead of data stored in the register T by the second micro-op 3. Therefore, inverting the execution order of two micro-ops with the same destination register changes the results coming from the execution of later microops that use the results from executing one of the earlier micro-ops.

Renaming has replaced each occurrence of a register as a destination address by a different physical register. For example, renaming replaces the destination register T of the first and second micro-ops 2, 3, of block 1, by the physical registers R and R' to produce renamed micro-ops 5, 6 of block 7 having different destination registers. Renaming also consistently replaces registers in the source addresses of dependent micro-ops by physical registers. For example, the source register T of the third micro-op 4 of block 1 is replaced by R' to give a third micro-op 8 of block 7. After renaming, the destination register R of the first micro-op 5 is not an address of the third micro-op 8. Subsequent to renaming, the first and renamed second micro-ops 5, 6 may be executed in-order or in reverse-order without changing the results coming from the dependent third micro-op 8.

FIG. 2 illustrates a portion of a prior art out-of-order processor 14. The processor 14 has a rename table 15 for integer registers (not shown) and a rename table 16 for floating-point registers (not shown). Data words from an integer and a floating-point register have different interpretations, e.g., different bits represent the exponents, and are often used by different execution hardware. Rows 17, 18, 19, 21, 22, 23 of the rename tables 15, 16 are indexed by the respective integer and floating-point temporary registers used by the decoder 24. Entries on each row 17, 18, 19, 21, 22, 23 are the names of physical integer and floating-point registers replacing the temporary registers assigned by the decoder 24. A rename unit 25 replaces each temporary register appearing as a destination address with a physical integer or floating-point register.

The rename unit 25 is contains the rename tables 15, 16. The rename unit 25 writes the identity of physical registers as entries in the rows 17, 18, 19, 21, 22, 23 of the corresponding temporary registers in the appropriate rename table 15, 16. The rename unit 25 also looks up temporary registers appearing as source addresses of micro-ops in the rename tables 15, 16. The rename unit 25 replaces these source temporary registers by the corresponding of physical registers.

Modem trends in processor design involve increasing operating frequencies. Higher frequencies often demand simpler micro-ops that are executable in shorter times. Decoding macro-instructions into the simpler micro-ops generally requires more temporary registers to store more intermediate results. Furthermore, processors using simpler micro-ops rely on more nested routines to deal with special situations that cannot be handled by the simpler micro-ops. The nested routines use temporary registers to store previous results while performing the routine. In both cases, the simpler micro-ops of future higher frequency processors will ordinarily have need for temporary registers assigned by the decoders. One way to accommodate more temporary registers is to increase the size of the rename table. But, the rename table already occupies a substantial amount of precious space on the chip die. Increasing the size may be prohibited by contemporary manufacturing limits on die sizes. Furthermore, the size of the rename unit would increase if the size of the rename table was increased. The size increase to the rename unit could lower the frequency at which renaming could be performed.

The present invention is directed to overcoming, or at least reducing the effects of, one or more of the problems set forth above.

SUMMARY OF THE INVENTION

In one aspect the present invention provides for an apparatus that includes at least two physical registers and a rename unit to assign at least one of the physical registers to an original register. The original register appears as a destination address in a micro-op. The apparatus includes a rename table having a location for recording the assigned physical register to the original register. The location has at least one bit for indicating whether the assigned physical register belongs to a first or a second class. The rename table is connected to the rename unit and is adapted to lookups of the assigned physical register.

BRIEF DESCRIPTION OF THE DRAWINGS

Other objects and advantages of the invention will become apparent upon reading the following detailed description and upon reference to the drawings in which:

FIG. 1 illustrates renaming of write-after-write instructions;

Figure 2:
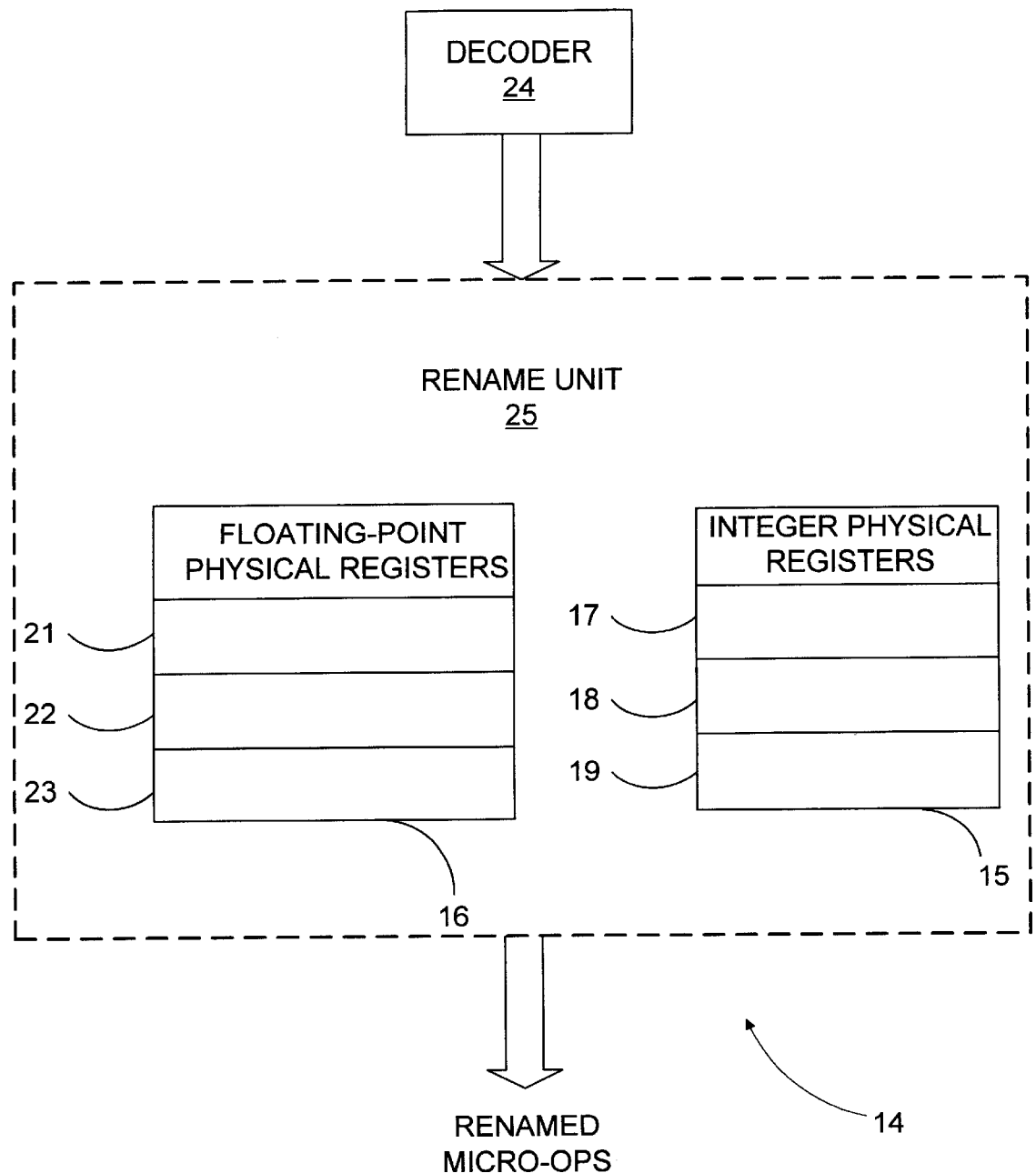
FIG. 2 illustrates a rename unit and rename table of the prior art.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Register class defines how binary data stored in member registers is to be interpreted. Generally, the bitwise organization of data has a different structure for different register classes. For example, a floating-point register has certain binary locations assigned for a sign, a mantissa, and an exponent. The same binary locations of an integer or multimedia register will generally be interpreted differently. The registers of different register classes may also store data words of different sizes. In performing operations on data, the processor hardware needs to know the full identifier of a register and how to interpret the data of the register.

Figure 3:
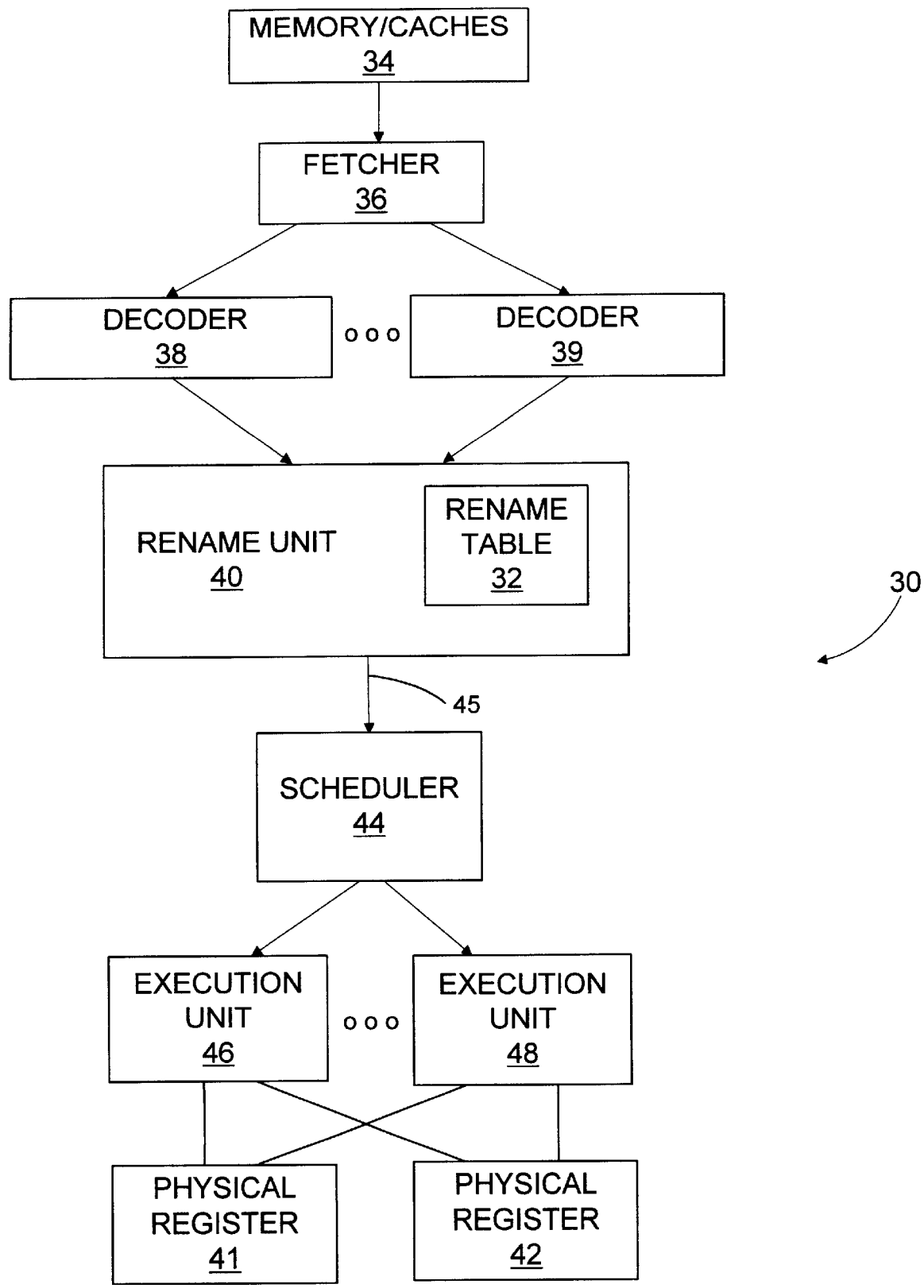
FIG. 3 is a high level block diagram illustrating a processor that employs a combined rename table.

The processor 30 of FIG. 3 employs a combined rename table 32 for more than one class of physical register 41, 42. Therefore, fully identifying a physical register 41, 42 requires both the name and the class of the register 41, 42. The class adds bits of data that enable uniquely identifying the physical register 41, 42. In the prior art, the register name fully identified a physical register, because different rename tables 15, 16, as illustrated in FIG. 2, were employed for different classes of physical registers. In the processor 30 of FIG. 3 replacing temporary registers, appearing in source addresses of micro-ops, and retiring physical registers 41, 42 require the full identifier, which includes both the name and the class of the physical register 41, 42.

FIG. 3 illustrates a portion of a processor 30 that employs a combined rename table 32 for original registers of more than one class. Instructions are retrieved from memory and/or caches 34 by a fetcher 36. The fetcher 36 sends the instructions to one or more decoders 38, 39. The decoders 38, 39 translate the instructions into micro-ops and send the micro-ops to a rename unit 40. The rename unit 40 assigns available physical registers 41, 42 of the processor 30 for temporary registers appearing in the micro-ops. The rename unit 40 assigns a different physical register 41, 42 to each temporary register appearing as a destination address.

The rename unit 40 contains the rename table 32. The rename unit 40 performs lookups in the rename table 32 and write the assignments of physical registers 41, 42 in the rename table 32. Each time that a temporary register appears as a destination register, the rename unit 40 writes the name of an available physical register 41, 42 to an entry corresponding to the temporary register in the rename table 32. The rename table 32 is a combined table for registers of at least two classes. Thus, the rename unit 40 also records information on the class of the physical register 41, 42 in the rename table 32. A particular physical register is unambiguously identified when both its name and its class are given. Thus, entries of the rename table 32 have both the name and the class of physical registers so that assignments and releases of actual registers are done unambiguously.

The rename unit 40 sends the renamed micro-ops to a scheduler 44. The scheduler 44 assigns the micro-ops for execution by the execution units 46, 48. The scheduler 44 is connected by lines 45 to the rename unit 40. In some embodiments, the execution units 46, 48 may perform different types of micro-ops, e.g., the execution units 46, 48 may be floating-point and integer arithmetic units, respectively. In some embodiments, lines also connect a retirement unit (not shown) to the rename unit 40 so that physical registers 41, 42 can be unassigned and/or flushed from speculative assignments.

The rename unit 40 assigns the physical registers 41, 42 to a preselected group of registers referred to as "original" registers. In some embodiments "original" registers are the temporary registers that are used by the decoder 38, 39 to decompose macro-instructions into micro-ops. In other embodiments, the original registers include other groups of registers (not shown) present in the processor 30. From the present disclosure, an ordinary person in the art can construct the rename unit 40 with a rename table 32 for any selected "original" registers without undue experimentation.

Figure 4:
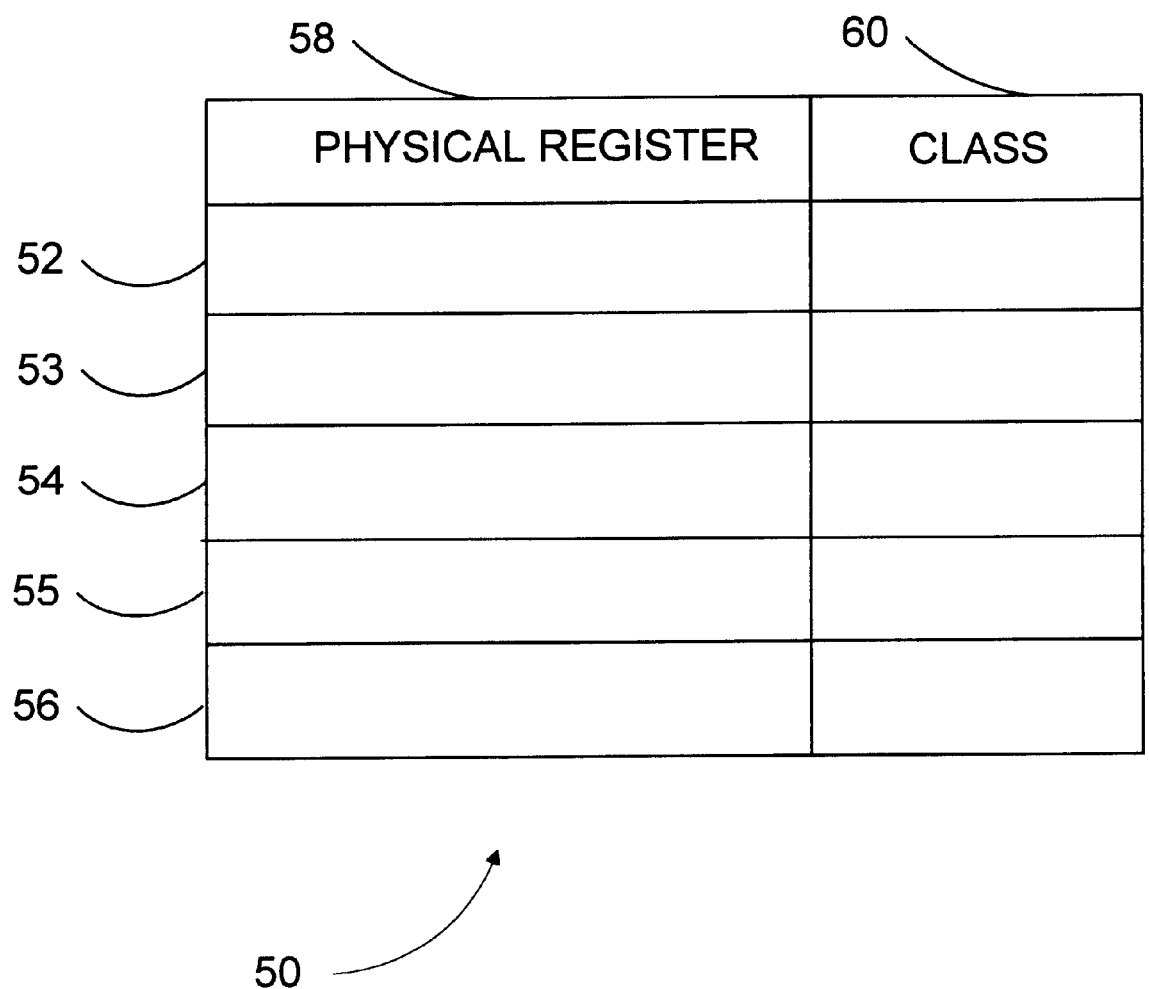
FIG. 4 illustrates an embodiment of the combined rename table.

FIG. 4 illustrates one embodiment 50 for the combined rename table 32 of FIG. 3. Each row 52, 53, 54, 55, 56 of the rename table 50 corresponds to a temporary register. Locations 58, 60 of each row 52, 53, 54, 55, 56 store the name 58 and the class 60 of the physical register 41, 42 of FIG. 3 assigned to the temporary register corresponding to the row 52, 53, 54, 55, 56. In some embodiments, each row 52, 53, 54, 55, 56 has two name entries (not shown). The first name is a speculative assignment of the physical register, and the second name is an architectural assignment of a physical register 41, 42 of FIG. 3, i.e. the speculative assignment becomes the architectural assignment at retirement of the associated micro-op. The rename unit 40 looks up the temporary registers of each instruction received from the decoders 38, 39. For each micro-op, the rename unit 40 writes an available physical register 41, 42 for each temporary register appearing as destination addresses, i.e. available physical registers 41, 42 do not appear already as an entry in the rename table 50. The rename unit 40 replaces temporary registers appearing as source addresses of micro-ops with the physical registers 41, 42 already appearing in the rename table 50.

Referring to FIG. 4, the locations 60 for storing information on the class of the physical registers 41, 42 of FIG. 3 can be single or multiple bit memory cells. Some embodiments employ multiple bit cells so that more than two classes, e.g., floating-point registers, integer registers, and multimedia registers, can be represented in the entries of the rename table 50. In some embodiments, the multiple bits are employed to store size information on registers.

The number of rows 52, 53, 54, 55, 56 in the rename table 50 is a limit on the number of temporary registers that may used at any particular time. The combined rename table 50 of FIG. 4 occupies less die space than the multiple rename tables of prior art processors, e.g., the two rename tables 15, 16 of FIG. 2. Thus, the rename unit 40 also occupies less die space. One embodiment performs renaming at higher frequencies due to the decreased size of the rename unit 40 that results from the smaller combined rename table 32.

A second embodiment uses the savings of die space to add more rows 52, 53, 54, 55, 56 to the combined rename table 50. A combined rename table 50 with more rows can increase the effective number of temporary registers that are usable at any particular time even though the total number of rows 52, 53, 54, 55, 56 in the combined rename table 50 is smaller than the combined number of rows in the multiple rename tables of a prior art processor, e.g., the rows 17, 18, 19, 21, 22, 23 in the separate rename tables 15, 16 of the prior art processor 14 of FIG. 2.

The increase in the effective number of temporary registers occurs, because micro-ops are ordinarily processed in flows that predominantly use one "class" of register. For example, a first flow may be micro-ops doing floating-point arithmetic and using primarily floating-point registers and a next flow may be micro-ops doing integer arithmetic and using integer registers. During a single flow, many of the rows 52, 53, 54, 55, 56 of the combined rename table 50 ordinarily have entries for physical registers of one class. During different flows of micro-ops the class that dominates the rename table 50 changes. But, in any single flow, the amount of rows, i.e. for different temporary registers, for the largely predominant class increases. In a processor 30 operating at higher frequencies the length of flows that use predominantly one class of temporary register often increases. Thus, future high-speed processors motivate the use of a combined rename table 50 that can "effectively" make more rows 52, 53, 54, 55, 56 available for temporary registers at any particular time.

Figure 5A:
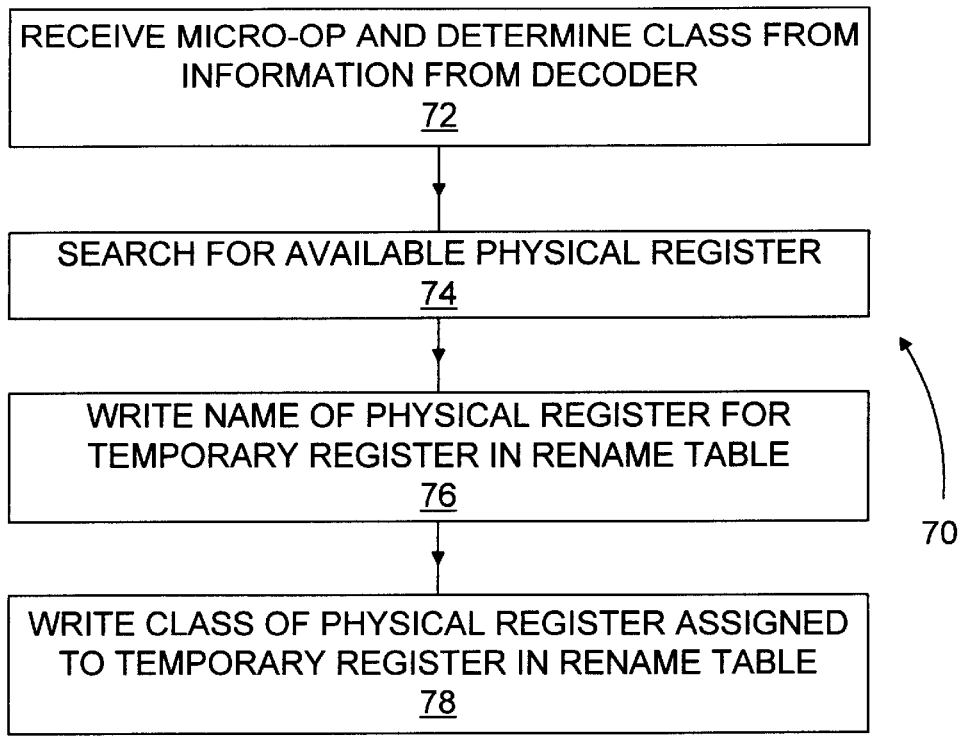
FIG. 5A is a flowchart illustrating the steps of a method for writing identities of physical registers to the combined register rename table.

FIG. 5A is a flowchart of the steps of a method 70 for updating the combined rename table 32 of FIG. 3. At block 72, the rename unit 40 receives a micro-op with information for the temporary registers of the micro-op from one of the decoders 38, 39. At block 74, the rename unit 40 searches for an available physical registers 41, 42 to replace a destination temporary register of the micro-op. At block 76, the rename unit 40 writes the name of a physical register 41, 42 in the row of the rename table corresponding to the temporary register. At block 78, the rename unit 40 writes the class of the physical register 41, 42 in the same row of the rename table 32. The actual physical register is identified by a name and a class, i.e. physical registers of different classes can have the same name.

Figure 5B:
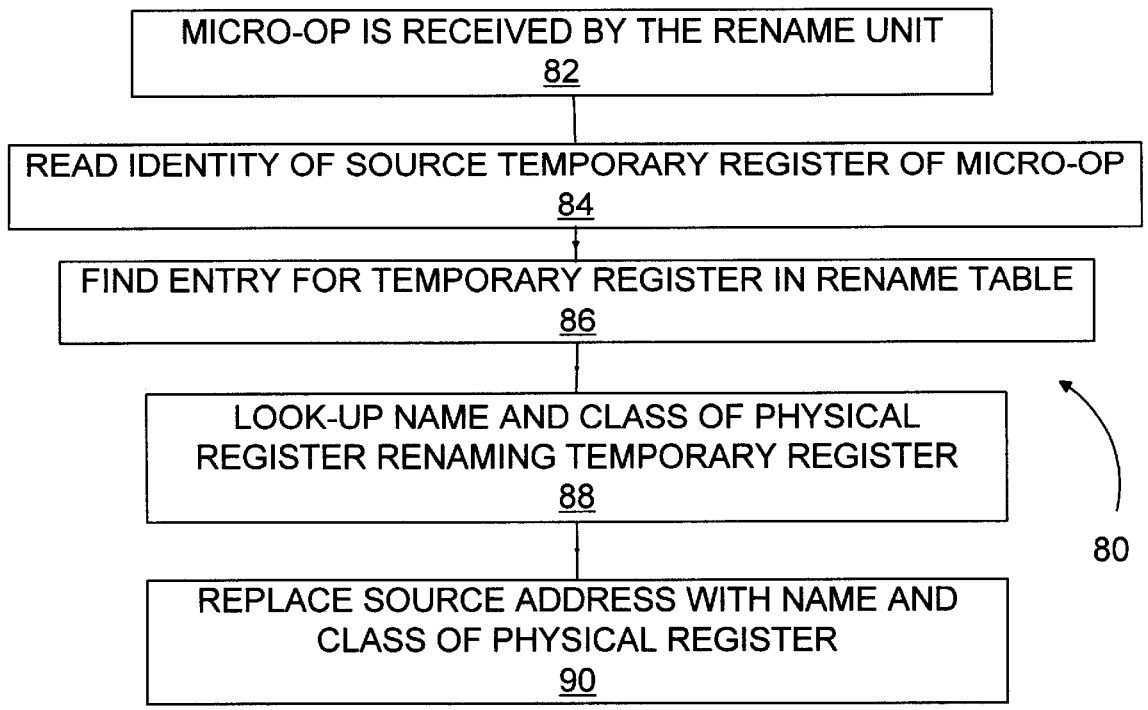
FIG. 5B is a flowchart illustrating the steps of a method for reading identities of physical registers from the combined register rename table.

FIG. 5B is a flowchart of the steps of a method 80 for assigning a physical register 41, 42 to a temporary source register of a micro-op. At block 82, the micro-op is received by the rename unit 40. At block 84, the temporary register appearing as a source address of the micro-op is read. At block 86, entry of the rename table 32 for the temporary register is found. At block 88, the name and the class of the physical register 41 assigned to the temporary register of the micro-op are looked up from the rename table 32. Then, at block 90, the source address of the micro-op is replaced with the name and the class of the physical register that is assigned to the temporary register in the rename table 32.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

What is claimed is:

1. A method, comprising:

reading a micro-op;

specifying a particular temporary register from among a plurality of temporary registers, the particular temporary register being associated with execution of the micro-op;

determining a class of data format required by the micro-op, the class being one of a plurality of classes of data formats;

determining a physical register for execution of the micro-op, the physical register available for execution of data in any of the plurality of classes of data formats;

writing a name of the physical register in a first field of a particular location of a rename table, the particular location being assigned to the particular temporary register;

writing the class of data format required by the micro-op in a second field of the particular location of the rename table; and using the physical register to execute the micro-op using the class of data format written in the particular location.

2. The method of claim 1, wherein:

the particular location is one of a plurality of locations in the rename table, each location assigned to one of a plurality of temporary registers.

3. The method of claim 1, wherein using the physical register includes reading class information from at least one bit in the particular location.

4. The method of claim 3, wherein reading class information includes determining whether the class of data format is one of a floating-point format and an integer format.

5. The method of claim 3, wherein reading class information includes reading a plurality of bits to determine whether the class of data format is one of at least three classes.

6. An apparatus, comprising:

a plurality of physical registers, each register to contain data in any of a plurality of data formats;

a decoder to decode instructions into micro-ops, each micro-op to operate on data in a selected one of the plurality of data formats;

a rename table coupled to the decoder and the plurality of physical registers, the rename table to assign a selected one of the plurality of physical registers to a selected one of the micro-ops, the rename table having a selected location with a first field to record a name of the selected one of the physical registers and with a second field to record the selected one of the data formats of the selected one of the micro-ops; and an execution unit coupled to the rename table and the plurality of physical registers to execute the selected micro-op using the selected data format for data in the selected register.

7. The apparatus of claim 6, wherein the selected register is selected without regard to the selected format.

8. The apparatus of claim 6, wherein the plurality of data formats includes a floating point format and an integer format.

9. The apparatus of claim 6, wherein the selected location in the rename table includes at least two bits to select from more than two data formats.

10. The apparatus of claim 6, wherein the location is one of a plurality of locations in the rename table, each of the plurality of locations corresponding to a particular temporary register.

11. The apparatus of claim 6, wherein the execution unit is to perform lookups in the rename table to determine the data format of data in the selected physical register.

12. The apparatus of claim 6, wherein the execution unit is to treat data in the selected physical register as one of a floating-point number and an integer number, based on the data format indicated in the selected location.

13. A processor, comprising:

a memory to store instructions;

a fetcher coupled to the memory to fetch instructions from the memory;

a plurality of physical registers, each register to contain data in any of a plurality of data formats;

a decoder coupled to the fetcher to decode instructions from the fetcher into micro-ops, each micro-op to operate on data in a selected one of the plurality of data formats;

a rename unit coupled to the decoder, the rename unit to assign a selected one of the plurality of physical registers to a selected one of the micro-ops, the rename unit having a selected location with a first field to record a name of the selected one of the physical registers and with a second field to record the selected one of the data formats of the selected one of the micro-ops; and an execution unit coupled to the rename unit and the plurality of physical registers to execute the selected micro-op using the selected data format for data in the selected register.

14. The processor of claim 13, wherein the selected register is selected without regard to the selected format.

15. The processor of claim 13, wherein the plurality of data formats includes a floating point format and an integer format.

16. The processor of claim 13, wherein the selected location in the rename unit includes at least two bits to select from more than two data formats.

17. The processor of claim 13, wherein the location is one of a plurality of locations in the rename unit, each of the plurality of locations corresponding to a particular temporary register.

18. The processor of claim 13, wherein the execution unit is to perform lookups in the rename unit to determine the data format of data in the selected physical register.

19. The processor of claim 13, wherein the execution unit is to treat data in the selected physical register as one of a floating-point number and an integer number, based on the data format indicated in the selected location.

* * * * *

UNITED STATES PATENT AND TRADEMARK OFFICE
CERTIFICATE OF CORRECTION

PATENT NO. : 6,279,102 B1  
DATED : August 21, 2001  
INVENTOR(S) : Morrison

It is certified that error appears in the above-identified patent and that said Letters Patent is hereby corrected as shown below:

<u>Column 2,</u>
Line 21, delete "Modem", insert -- Modern --.

Signed and Sealed this

Fourth Day of June, 2002

Attest:

Attesting Officer

JAMES E. ROGAN
Director of the United States Patent and Trademark Office